No. 875,363.
PATENTED DEC. 31, 1907.
R. E. L. MARTIN.
PISTON ROD PACKING.
APPLICATION FILED JULY 3, 1907.
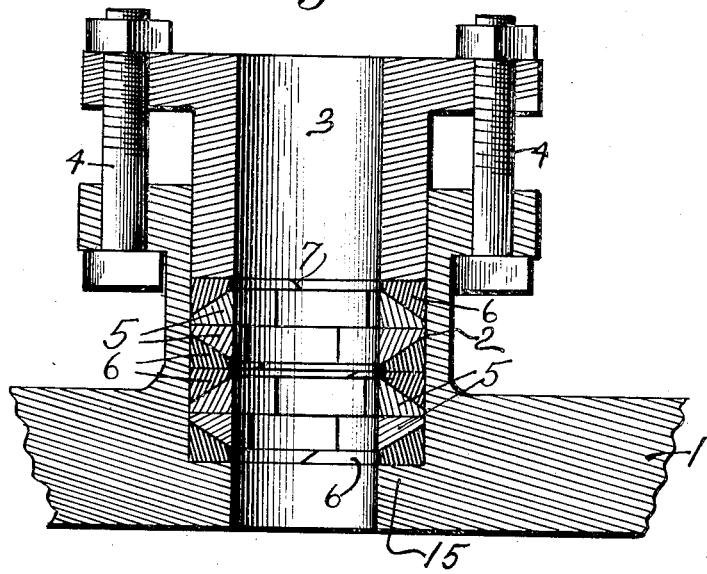
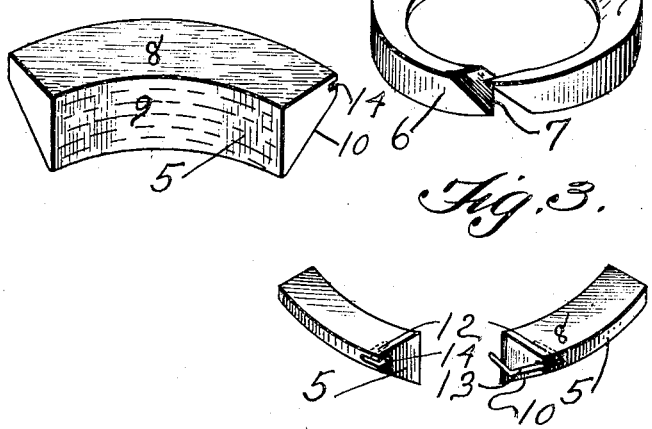
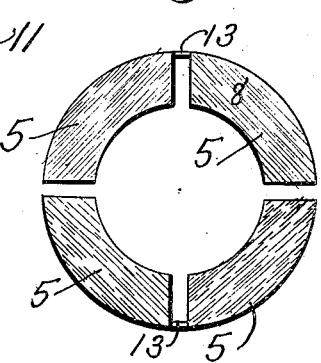
Witnesses:-
Inventor:
Robert Edward Lee Martin

UNITED STATES PATENT OFFICE.

ROBERT EDWARD LEE MARTIN, OF PORT NECHES, TEXAS.

PISTON-ROD PACKING.

No. 875,363.  Specification of Letters Patent.  Patented Dec. 31, 1907.

Application filed July 3, 1907. Serial No. 382,007.

*To all whom it may concern:*

Be it known that I, ROBERT EDWARD LEE MARTIN, a citizen of the United States, residing at Port Neches, in the county of Jefferson, State of Texas, have invented certain new and useful Improvements in Piston-Rod Packing, of which the following is a description, reference being had to the accompanying drawings, forming a part hereof.

The object of my invention is to provide an improved piston-rod packing designed particularly for use with oil pumps wherein such types of packing as I am acquainted with have proven unsatisfactory; and it consists in a packing comprising a plurality of beveled packing members designed to surround and to be in contact with the piston-rod to be packed and made of wood, whereby the piston-rod is subjected to a minimum amount of wear; in combination with a yielding beveled packing ring composed of asbestos or other similar material which will not be injuriously affected by the fluid operated upon by the pump; together with suitable means for forcing the various elements constituting the packing as a whole together, whereby the wooden packing members are forced inward against the piston-rod and a tight packing secured.

With the above object in view my invention consists in the improved piston-rod packing illustrated in the various figures of the accompanying drawing, described in the following specification, and particularly claimed in the concluding claim.

In the accompanying drawing, Figure 1 is a central sectional view of my piston-rod packing, the plane thereof passing through the axis of a rod to be packed, the rod being omitted in order that the packing may be better shown; Fig. 2 is a perspective view of one of a plurality of yieldable asbestos packing rings forming a part of my packing; Fig. 3 is a perspective view showing two wooden packing members and means for fastening said members together, said members forming part of a series of similar packing members used in my device; Fig. 4 is a plane view of a series of wooden packing members as shown in Fig. 3, this view illustrating the relation of the grain of the wood to the peripheral surfaces of the wooden packing members; and Fig. 5 is a perspective view of one of the wooden packing members, this view also showing the grain of the wood of which the packing member is made.

In the drawings, 1 represents a portion of the head of a pump cylinder with which my packing is used, the piston-rod to be packed being omitted to better show the packing. The head 1 is provided with a recess 2 having an inwardly projecting ledge 15, in which recess my packing is held; and 3 is a gland designed to engage and compress the packing in order to maintain a tight joint between the packing and the piston-rod.

4, 4 are bolts for moving the gland 3 to compress the packing.

My packing comprises a series of wooden packing members 5 designed to surround the piston-rod to be packed and to be in contact therewith as the rod reciprocates, one of which members is shown in Fig. 5; and a series of such members as arranged to surround the rod to be packed is shown in Fig. 4. In my complete packing I ordinarily employ a plurality of such series of wooden packing members, four such series being illustrated in the complete packing shown in Fig. 1; and I ordinarily arrange said members so that two series of members contact with each other in a plane at right angles to the piston-rod as shown in Fig. 1, which arrangement is facilitated by the form of the packing members; each member having two surfaces 8 and 9 which meet at a right angle, and a third beveled or inclined surface 10 connecting said surfaces.

6 represents a yieldable packing ring made preferably of asbestos and divided upon an incline as shown at 7. This packing ring is of right angular triangular form in cross-section, and has a beveled or inclined surface at 11 designed to be in contact with the beveled surfaces 10 of the wooden packing members when the packing is assembled as shown in Fig. 1. I employ a plurality of such packing rings in my complete packing, so that the inclined or beveled surfaces of the wooden packing members constituting each series thereof will be in contact with a corresponding beveled surface of a yielding packing ring. By this arrangement it will be seen that as the gland 3 is moved to tighten the packing, the beveled or inclined surfaces 11 of the yieldable packing rings will coöperate with the beveled or inclined surfaces 10 of the wooden packing members to force said members inward against the piston-rod to be packed; and that the upper and lower yieldable packing rings, as shown in Fig. 1, will prevent the series of wooden packing members with which they respectively engage from coming into contact with the lower end of the metallic gland 3 and ledge 15 of the metallic cylinder head.

I cut the wooden packing members 5 from a board of suitable thickness and in such a way that the grain of the wood will extend longitudinally of said members, as indicated by the parallel surface lining in Figs. 4 and 5; and so that the grain in the surface 9 which comes into contact with the piston-rod to be packed will extend in the direction of movement of the said rod, as indicated in Fig. 5. By this arrangement the tendency of the lower edge of the wooden packing members, which meet the piston-rod at an acute angle, to split off is reduced to a minimum, a better bearing surface results, and the piston-rod is subjected to a minimum of wear.

As above stated, I have designed my packing with especial reference to use in a pump designed for pumping oil, and I have found wooden packing especially well adapted for piston-rod packings for such pumps. In such packings I have found it impossible to use yieldable packing rings made of rubber, or of a packing material containing rubber, for the reason that the oil attacks and soon destroys the rubber, thereby rendering the packing ineffective. For this reason I employ asbestos, or other material not acted upon by the oil as the material for the yieldable packing rings, whereby a serviceable packing and one not affected by the oil being pumped, is produced.

I prefer to connect the wooden packing members 5 constituting each series together in pairs, as shown in Figs. 3 and 4; for which purpose I provide holes 12 adjacent abutting ends of adjoining members of the series, as shown in Fig. 3, and recesses 14 extending therefrom to the ends of the packing members.

13 is a staple, the leg portions of which enter the holes 12 and the connecting portion of which enters into and lies within the recesses 14 when the packing members are connected together, all as will be apparent from the features of construction illustrated in Fig. 3 of the drawing.

It will be understood that the vertical lines appearing in the surface 9, Fig. 5, represent the intersection therewith of vertical planes extending longitudinally of the packing member 5 in the direction of the grain of the wood as indicated by the parallel lines in the surface 8. Of course as wood has a fibrous structure other lines indicating the grain appear as parallel arcs (because of the showing in perspective) in the surface 9, and with reference to the grain thus considered the piston-rod moves across the grain of the wood.

Having thus described my invention and explained the mode of operation thereof, I claim and desire to secure by Letters Patent:

1. A piston-rod packing comprising a cylinder head; a recess therein; a series of beveled wooden packing members located in said recess; a yieldable beveled packing ring located in said recess, the beveled surface thereof being in engagement with the beveled surfaces of said packing members; a gland in engagement with said yieldable ring; and means for forcing said gland against said ring: the arrangement of the packing members and yieldable ring being such that the beveled surfaces thereof coact to force said members inward as the gland is forced against the packing ring.

2. A piston-rod packing comprising a cylinder head; a recess therein; a pluraltiy of series of beveled wooden packing members located in said recess; a plurality of yieldable beveled packing rings located in said recess, the beveled surfaces thereof being in engagement with the beveled surfaces of said packing members; a gland in engagement with one of said packing rings; and means for moving said gland to adjust said packing: the arrangement of the packing members and yieldable ring being such that the beveled surfaces thereof coact to force said members inward as the gland is moved to adjust the packing.

3. A piston-rod packing comprising a cylinder head; a recess therein; a series of beveled wooden packing members located in said recess, each member being cut in such a way that the grain of the wood extends longitudinally of said members; a yieldable beveled asbestos packing ring located in said recess, the beveled surface thereof being in engagement with the beveled surfaces of said packing members; a gland in engagement with said yieldable asbestos ring; and means for forcing said gland against said ring: the arrangement of the packing members and yielding ring being such that the beveled surfaces thereof coact to force said members inward as the gland is forced against the packing ring.

4. A piston-rod packing comprising a cylinder head; a recess therein; a plurality of series of beveled wooden packing members located in said recess, each member being cut in such a way that the grain of the wood extends longitudinally of the inner surface of said members with which surface the piston-rod contacts; a plurality of yieldable beveled asbestos packing rings located in said recess, the beveled surfaces thereof being in engagement with the beveled surfaces of said packing members; a gland in engagement with one of said packing rings; and means for moving said gland to adjust said packing; the arrangement of the packing members and yieldable ring being such that the beveled surfaces thereof coact to force said members inward as the gland is moved to adjust the packing.

5. In a piston-rod packing, a series of beveled segmental wooden packing members designed to surround a rod to be packed and to contact therewith; holes adjacent abutting ends of members of said series; a connecting staple the legs of which enter said holes; a yieldable beveled asbestos packing ring, the beveled surface thereof being in engagement with the beveled surfaces of said packing members; and means in engagement with one of said packing rings for forcing said series of packing rings and said yieldable ring toward each other, whereby the beveled surfaces aforesaid coact to force the packing members inward.

This specification signed and witnessed this 18th day of June, A. D. 1907.

ROBERT EDWARD LEE MARTIN.

In the presence of—
JAS. L. OUTRY,
J. S. GIBBS.